July 25, 1967  J. L. HEINLEIN  3,332,222
SIDE DELIVERY RAKE
Filed Jan. 29, 1964
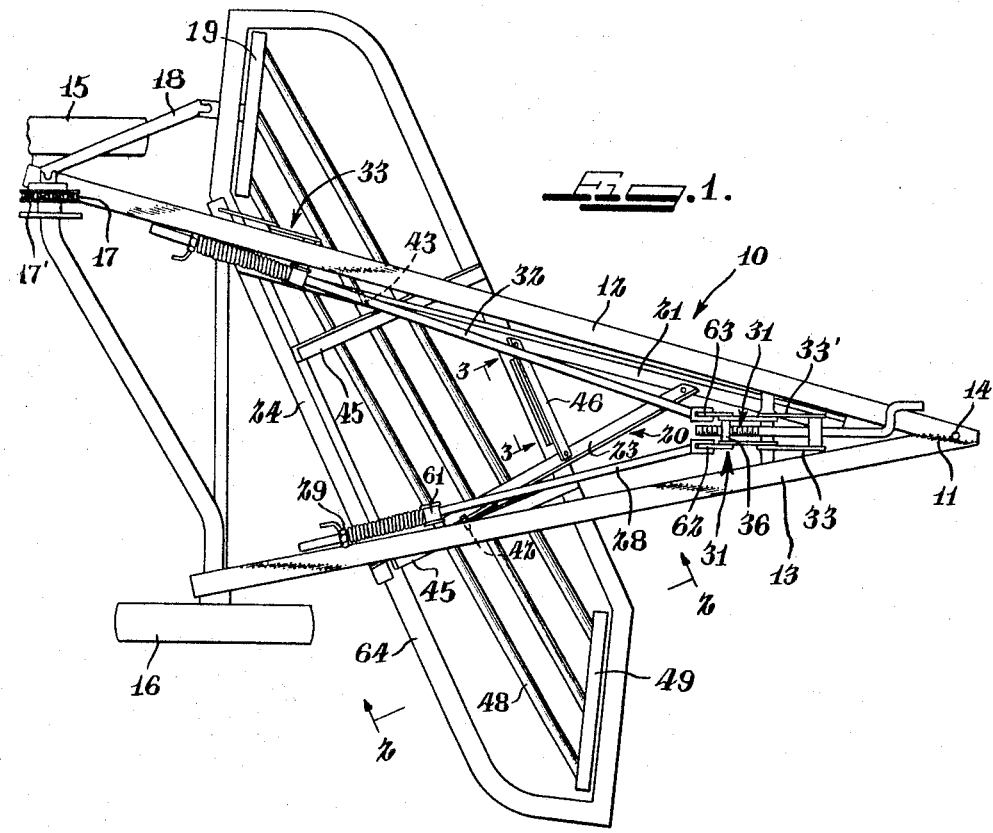
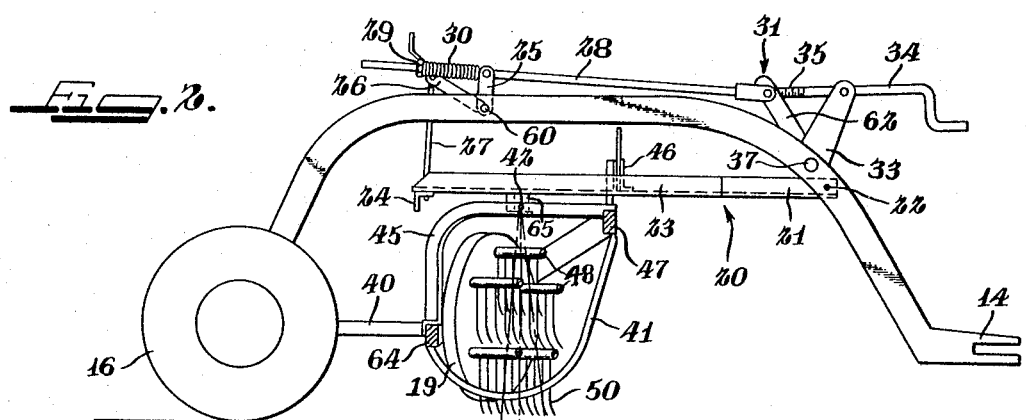
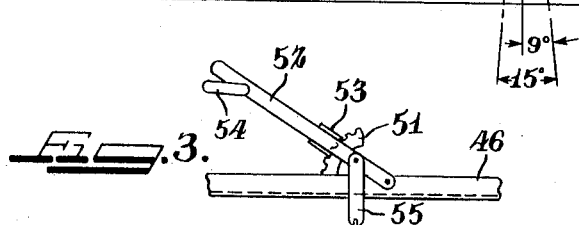
INVENTOR.
JOHN L. HEINLEIN
BY
Greist, Lockwood, Greenawalt & Dewey
Attys.

United States Patent Office 3,332,222
Patented July 25, 1967

3,332,222
SIDE DELIVERY RAKE
John L. Heinlein, Shelbyville, Ill., assignor to Oliver Corporation, Chicago, Ill., a corporation of Delaware
Filed Jan. 29, 1964, Ser. No. 341,015
5 Claims. (Cl. 56—377)

ABSTRACT OF THE DISCLOSURE

A side delivery rake having a subframe pivotally suspended beneath a main frame, and a rake basket pivotally mounted on the subframe. Means is provided for quick field adjustment of the subframe relative to the main frame and independent adjustment of the rake basket relative to the subframe to permit change in the angle of the rake teeth relative to the ground for optimum crop pickup under varying conditions.

---

This invention relates to side delivery rakes in general and more specifically is directed to a unique system for suspending the rake basket and reel to permit quick and easy adjustment of the pitch of the rake basket and teeth with respect to the ground.

In the present invention, a Y-shaped subframe assembly is suspended beneath a generally V-shaped main frame by means of a single pivoting connection through the tail of the Y. The rearward ends of the Y-shaped subframe are adjustably connected to the leg portions of the V-shaped main frame with suitable means provided to allow the rearward end of the subframe to be lowered and raised in a quick and convenient manner for adjusting ground clearance.

A rake basket assembly of conventional construction is pivotably mounted beneath the rearwardly projecting ends of the subframe, with the pivot mountings being substantially in vertical alignment with the center of gravity of the rake basket assembly. Additional adjustment means is mounted on the subframe and operatively connected to the rake basket to permit the rake basket to be moved about its pivotable mountings, thereby adjusting the angularity of the rake basket and rake teeth with respect to the ground independently of the subframe adjustment. The simplified forms of adjustment provided by the present invention enable any desired angularity and clearance to be selected with a minimum amount of effort and time thereby to minimize the time lost in raking while enhancing the over-all quality of the raking job.

The present invention permits the operator of the side delivery rake to select and reselect the desired rake pitch and angularity of the rake basket in a most expedient manner to obtain the best type of windrow under existing crop conditions. Several other advantages in the form of reduced manufacturing costs are achieved by the present uncomplicated adjustable design, all of which will become more apparent in the ensuring description to follow.

It is therefore an object of this invention to provide adjustment means on a side delivery rake for changing the pitch of the rake teeth and basket relative to the ground to effect a better quality rake job under varying crop conditions.

It is a further object of this invention to provide a simplified and easily operated adjustment lever on a side delivery rake to permit selection and reselection of the appropriate basket and rake teeth angle relative to the ground to accommodate the varying crop conditions.

It is a further object of this invention to provide a side delivery rake having a subframe adjustably mounted on a main frame and including means mounted on the subframe to permit angularity adjustment of the rake teeth to be accomplished with a minimum amount of time and effort on the part of the operator.

It is a further object of this invention to provide a side delivery rake having a simplified form of rake tooth and basket adjustments which permits rapid selection of the appropriate rake tooth pitch for best raking under varying crop conditions.

It is a still further object of this invention to provide a side delivery rake having means to permit adjustment of the subframe supporting the rake basket relative to the main frame and additional means carried by the subframe for adjusting the rake basket and teeth angularly about pivots mounting the rake basket thereby to obtain a wider variety of angular adjustments than heretofore known in prior art devices.

Further and fuller objects will become readily apparent when reference is made to the accompanying drawings wherein:

FIG. 1 is a top fragmentary plan view of the side delivery rake of the present invention;

FIG. 2 is a side elevational view taken generally along the lines 2—2 of FIG. 1; and FIG. 3 is an enlarged fragmentary view of a lever adjustment means carried by the subframe being taken generally along the lines 3—3 of FIG. 1.

Referring now to FIGS. 1 and 2, a side delivery rake is indicated at 10 including a main frame 11 of generally V configuration having leg members 12 and 13 extending rearwardly of a hitch portion 14 at the apex of the V. Each of the legs 12 and 13 on the main frame 11 supports a ground engaging wheel 15 and 16 respectively. Suitable drive means extends between the wheels 15 and 16 and has a sprocket (not shown) to drive a chain 17 passing over a sprocket 17' which drives a reel wheel or drum 19 through a universal arrangement 18. The reel driving arrangement may, for example, be of the type shown and described in the patent to Hill, No. 2,929,192 issued Mar. 22, 1960.

A subframe assembly of generally Y configuration is indicated generally by the reference character 20, and includes a first frame member 21 joined at its forward end to the leg 12 of the main frame by means of a pivotable connection 22 such as a bearing bolt or the equivalent. The rearward end of the first frame member 21 is adjustably connected to the rearward portion of the main frame leg 12 in a manner to be more completely described hereinafter.

A second frame member 23 is joined to the first frame member 21 intermediate its ends to form a Y shape, and extends rearwardly, diverging from the first frame member 21 and terminating adjacent the leg 13 of the main frame 11. A diagonal brace 24 joins the rearward ends of the frame members 21 and 23 to maintain proper spacing and lend strength to the subframe. The rearward portion of the second frame member 23 is also adjustably carried on the main frame 11 in the same manner as the rearward portion of the first frame members 21 and 23 being substantially parallel to the diagonal brace 24 and supports an adjustment lever in a manner to be described in connection with FIG. 3.

The manner of adjustably suspending the rearward portion of the second frame member 23 forming a part of the subframe 20 is best seen in FIG. 2 and includes a pair of link member 25 and 26 joined together at one end and pivotably mounted on the main frame as at 60. At its outer end, link 26 is joined to a vertically disposed rod 27 having the lower end thereof connected to the rearward portion of the subframe. Link member 25 is provided with a pivoting sleeve 61 slidably and rotatably receiving the rearward end of a subframe adjustment rod 28. The rearward end of the subframe adjustment rod 28 is threaded and receives a handle nut member 29 acting against one end of a compression spring 30 which has the other end in abutment with the pivoting sleeve 61 to support the subframe in a cushioned manner. The subframe adjustment rod 28 is bifurcated at its forward end and joined to a bell crank lever assembly 31.

An identical adjustable suspension system is provided for the rearward portion of the first frame member 21 and in the interest of brevity is identified generally by reference character 33 in FIG. 1. A subframe adjustment rod 32 is connected at its rearward end to the suspension system 33 in the manner described in connection with the subframe adjustment rod 28. This type of connection permits the rake basket to move upwardly when obstructions are encountered while the coil springs soften the impact as the basket returns to its original position. The forward end of the subframe adjustment rod 32 is provided with a bifurcated end which is joined to the lever assembly 31 in a manner similar to the forward end of the subframe adjustment rod 32.

The bell crank lever assembly 31 includes levers 62 and 63 pivotably mounted at one end on the main frame 11 with the other ends connected to the bifurcated end of the subframe adjustment rods 28 and 32 respectively. A transverse brace 36 interconnects the levers 62 and 63 for simultaneous movement in response to adjustment.

A pair of fixed mounting levers 33 and 33' support a crank 34 in a manner so as to be freely rotatable however, restrained from axial movement. The crank 34 is threaded as at 35 and received in an internally threaded portion of the transverse brace 36 extending between the levers 33 and 33'. Rotation of the crank 34 causes the lever assembly 31 to move angularly about pivot 37 which in turn pulls the adjustment rods 28 and 32 forwardly or rearwardly to raise and lower the subframe 20 about the pivot 22. This will permit accurate control of the ground clearance between the rake basket and teeth as will be described more fully hereinafter. The handle nut 29 permits separate fine adjustment of the individual subframe adjustment rod 28 with a similar fine adjustment being provided on the subframe adjustment rod 32.

A rake basket 41 of conventional design is suspended from the subframe by means of pivoting connections 42 and 43. A pair of transversely spaced brace members 44 and 45 are connected to the main frame 64 of rake basket 41 and are provided with suitable apertures substantially vertically in line with the rotational axis of the reel and the center of gravity of the basket. A pair of basket support members (only one illustrated at 65) are attached to the first and second frame members 21 and 23 and a horizontally disposed bearing bolt or the equivalent, generally parallel to the axis of the rake basket, joins the basket support members to the transversely spaced brace members 44 and 45 for pivoting movement.

The rake basket 41 rotatably supports a reel of conventional design including raking bars 48 carried between the drums 19 and 49. Each of the raking bars 48 is provided with a plurality of teeth 50 to perform the raking function in a well known manner. A stabilizing bar 40 extends from a rearward portion of the leg 13 on the main frame 11 to the frame 64 on the rake basket 41, being pivotably joined at opposite ends to allow raising and lowering of the rake basket 41 and also pivoting movement about the pivotable axis through pivots 42 and 43.

As discussed briefly above, the subframe assembly 20 may be adjusted about its pivoting axis 22 thereby to raise and lower the basket 41 mounted beneath the subframe assembly to control ground clearance. An additional adjustment is provided in the present invention which permits the basket 41 to be adjusted angularly relative to the subframe assembly 20 thus adjusting the angle of the rake teeth relative to the ground. This adjustment is more clearly illustrated in the enlarged view of FIG. 3 and includes a quadrant type gear 51 mounted on the cross brace 46 forming a part of the subframe assembly 20.

The cross brace 46 pivotably supports one end of a handle 52 which slidably carries a locking pawl 53 adapted to engage the teeth on the quadrant gear 51. A pawl release lever 54 of conventional design is provided to permit the pawl 53 to be withdrawn from engagement with the quadrant gear teeth and thereby permit the handle 52 to be moved to any selected position.

A connecting link 55 is pivotably joined to the handle 52 at one end, with the lower or opposite end being connected to a forward portion 47 of the basket 41. An eye bolt 56 or the equivalent is joined to the lower portion of the connecting link 55 and extends through a suitable aperture in the frame 47. The lower end of the eye bolt 56 is threaded and receives a nut member acting against a compression spring 57 interposed between the frame 47 and the lower end of the eye bolt 56. Accordingly, the basket is suspended about its pivotable mounting axis at 42 and 43 in a resilient manner to allow the basket 41 to rotate rearwardly if necessary when obstructions are encountered. Under normal raking conditions, the basket will be maintained in the position to which it is adjusted.

When the handle 52 is raised, the forward end of the basket 41 moves upwardly to change the angularity of the rake teeth 50 with respect to the ground. The limits of forward angularity change are illustrated in the side elevational view of FIG. 2 being of the order of about 9° from a purely vertical position. If the handle 52 is moved to the down position, the forward end of the rake basket 41 moves downwardly causing a change in the angularity of the rake teeth 50 with respect to the ground. An angularity change of the order of about 6° from a purely vertical position has been found to be sufficient. Obviously this may be increased if desired.

Varying crop conditions will oftentimes dictate that a different angularity of the rake teeth with respect to the ground be selected in order to provide a cleaner pick-up and obtain the best type of windrow under existing crop conditions. Ground clearance, which may be readily adjusted through operation of the crank 34 is generally dictated by the type of terrain and existing crop conditions. The simplified form of ground clearance and angularity adjustments provided by the present invention permits selection to be made in a most expedient manner thus eliminating any delay in the raking operation.

The adjustments afforded by the present invention allow a greater variation in pitch or tooth angularity with respect to the ground than was available in known prior art devices. Moreover the simplified manner of effecting adjustment to compenate for changes in crop conditions may be performed with a minimum amount of effort since the rake basket is suspended from pivots generally vertically in line with the center of gravity. A particular adjustment which has been found appropriate for certain crop conditions can be easily reselected by the rake operator through the provision of the simplified form of adjustments shown. Accordingly, the raking function may be accomplished more efficiently and more cleanly than was possible with existing rakes.

It will become immediately obvious to those skilled in the art that various modifications can be made to the present device without departing from the inventive concepts set forth herein. Therefore, it is to be understood that any limitations imposed are to be within the spirit and scope of the appended claims.

I claim:

1. A side delivery rake comprising a main frame of generally V shape having the apex of the V extending forwardly and the legs of the V rearwardly, a ground engaging wheel on each of the legs, a hitch on the forward end of the rake for connection to a tractor, a generally Y-shaped subframe mounted on said main frame, one end of said subframe being pivotably joined to said main frame, means adjustably joining the other end of said subframe to said main frame, a rake basket pivotably mounted on and beneath said subframe and means mounted on said subframe to adjust said rake basket about its pivotable mountings to change the angle of the rake teeth with respect to the ground without affecting the position of the subframe relative to the main frame, said mountings supporting said rake basket from said subframe for pivoting movement, being disposed in a plane substantially vertically in line with the center of gravity of the rake basket.

2. A side delivery rake comprising a main frame of generally V shape having the apex of the V extending forwardly and the legs of the V rearwardly, a ground engaging wheel on each of the legs, a hitch on the forward end of the rake for connection to a tractor, a generally Y-shaped subframe mounted on said main frame, one end of said subframe being pivotably joined to said main frame, means adjustably joining the other end of said subframe to said main frame, a rake basket pivotably mounted on and beneath said subframe and means mounted on said subframe to adjust said rake basket about its pivotable mountings to change the angle of the rake teeth with respect to the ground without affecting the position of the subframe relative to the main frame, said means mounted on said subframe to adjust said rake basket about its pivotable mountings including a cross brace on said subframe, an angularly movable handle mounted on said cross brace, means joining said handle to said rake basket for moving said rake basket about its pivots when said handle is moved, and means to maintain said handle in any desired adjusted position.

3. A side delivery rake comprising in combination a main frame of generally V shape configuration, means at the apex of the V to permit pulling of said rake, wheel means on each of the legs of said V for supporting the rearward end of said rake, a subframe carried beneath said main frame, said subframe including first and second frame members, the first frame member being pivotably joined at its forward end to said main frame adjacent the apex of said V and extending rearwardly beneath one of said legs, means adjustably joining the rearward end of said first frame member to said main frame, said second frame member being joined at its forward end to said first frame member and extending in a divergent manner towards the other leg of said V, means adjustably joining the rearward end of said second frame member to said main frame, a rake basket disposed beneath said subframe diagonal to the direction of rake movement, means pivotably mounting said rake basket on said subframe, a cross brace extending between said first and second members, selective adjustment means mounted on said cross brace, and means connecting said selective adjustment means to said rake basket at a point spaced from a plane passing through said means pivotably mounting said rake basket to permit angular adjustment of said rake basket.

4. The side delivery rake of claim 3 wherein said selective adjustment means includes a handle mounted on said cross brace for angular movement, and locking means on said handle co-operating with means on said cross brace to maintain said handle in the selected adjusted position.

5. The side delivery rake of claim 4 wherein said means connecting said adjustment means to said rake basket includes a link resiliently joined to said rake basket.

References Cited
UNITED STATES PATENTS

| | | | |
|---|---|---|---|
| 2,635,412 | 4/1953 | Schroeppel | 56—377 |
| 2,861,415 | 11/1958 | Carlson et al. | 56—377 |
| 2,991,613 | 7/1961 | Breed | 56—377 |

ABRAHAM G. STONE, *Primary Examiner.*

P. A. RAZZANO, *Assistant Examiner.*